United States Patent [19]

D'Antonio et al.

[11] Patent Number: 4,496,168

[45] Date of Patent: Jan. 29, 1985

[54] CURRENT SUPPLY CIRCUIT FOR ELECTRONIC SAFETY SKI BINDINGS

[75] Inventors: Nicholas F. D'Antonio, Liverpool, N.Y.; Walter Knabel, Farchant; Lorenz Stempfhuber, Garmisch-Partenkirchen, both of Fed. Rep. of Germany

[73] Assignees: Marker-Patentverwertungsgesellschaft mbH, Baar, Switzerland; Kinetronic Industries, Inc., Media, Pa.

[21] Appl. No.: 373,506

[22] PCT Filed: Aug. 25, 1981

[86] PCT No.: PCT/EP81/00138

§ 371 Date: Apr. 22, 1982

§ 102(e) Date: Apr. 22, 1982

[87] PCT Pub. No.: WO82/00594

PCT Pub. Date: Mar. 4, 1982

[30] Foreign Application Priority Data

Aug. 25, 1980 [DE] Fed. Rep. of Germany ....... 3031981

[51] Int. Cl.$^3$ ............................................. A63C 9/085
[52] U.S. Cl. ...................................... 280/612; 307/66
[58] Field of Search ................... 280/612, 613; 307/65, 307/66, 41

[56] References Cited

U.S. PATENT DOCUMENTS

| | | | |
|---|---|---|---|
| 429,189 | 9/1881 | D'Antonio et al. | 280/612 |
| 3,013,257 | 12/1961 | Ippolito | 307/66 |
| 3,120,632 | 2/1964 | Hopt | 307/66 |
| 3,555,290 | 11/1971 | Ellermeyer | 307/65 |
| 3,577,003 | 5/1971 | Behr et al. | 307/66 |
| 3,631,257 | 12/1971 | Behr et al. | 307/130 X |
| 3,666,962 | 5/1972 | Bogue | 307/65 |
| 4,137,557 | 1/1979 | Ciarniello et al. | 361/92 |
| 4,181,842 | 1/1980 | Elias | 307/66 |
| 4,280,714 | 7/1981 | Salomon | 280/612 |
| 4,315,162 | 2/1982 | Ferguson | 307/66 |
| 4,436,321 | 3/1984 | Storandt et al. | 280/612 |

FOREIGN PATENT DOCUMENTS

| | | |
|---|---|---|
| 2658077 | 6/1978 | Fed. Rep. of Germany . |
| 3017841 | 11/1981 | Fed. Rep. of Germany ...... 280/612 |
| 2418655 | 9/1979 | France . |

OTHER PUBLICATIONS

Hull and Allen, "Design of an Actively Controlled Snow Ski Release Binding", Aug. 1981, Journal of Biomechanical Engineering, pp. 138–145.
Electronic Design Magazine, Mar. 1, 1976, A. Levy, "Keep Your Power Flowing Etc.," pp. 62–64.

Primary Examiner—Joseph F. Peters, Jr.
Assistant Examiner—Michael Mar
Attorney, Agent, or Firm—D. Peter Hochberg

[57] ABSTRACT

A power supply for the release circuitry of an electronic ski binding having a plurality of electrical sources, switches for controlling the connecting of the respective electrical sources to the release circuitry, and comparator circuits for actuating the appropriate switches to connect the electrical source having the highest electrical potential to the release circuitry.

14 Claims, 2 Drawing Figures

SIMPLIFIED BLOCK DIAGRAM WITH THE MOST IMPORTANT FUNCTIONAL COMPONENTS

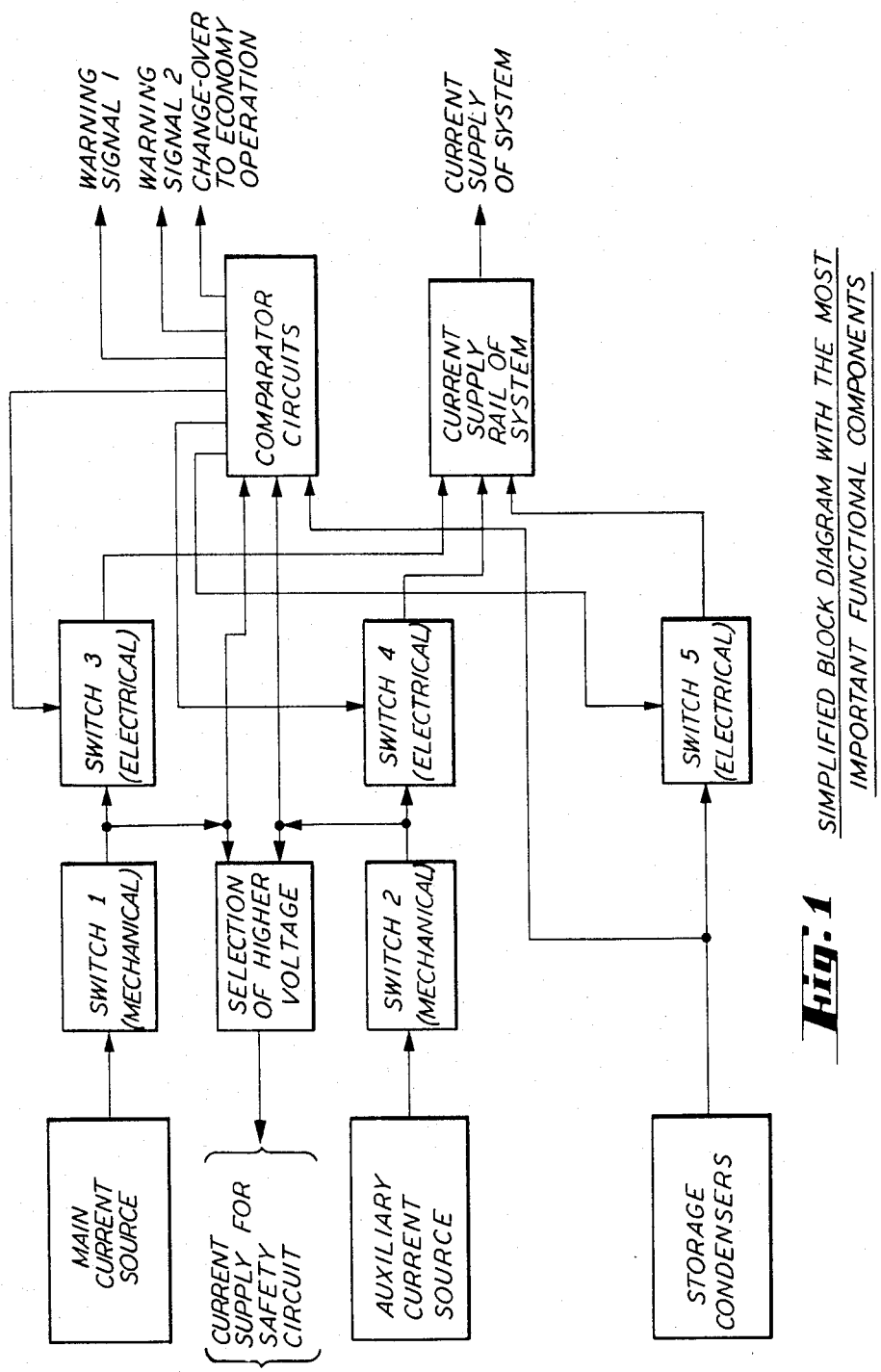

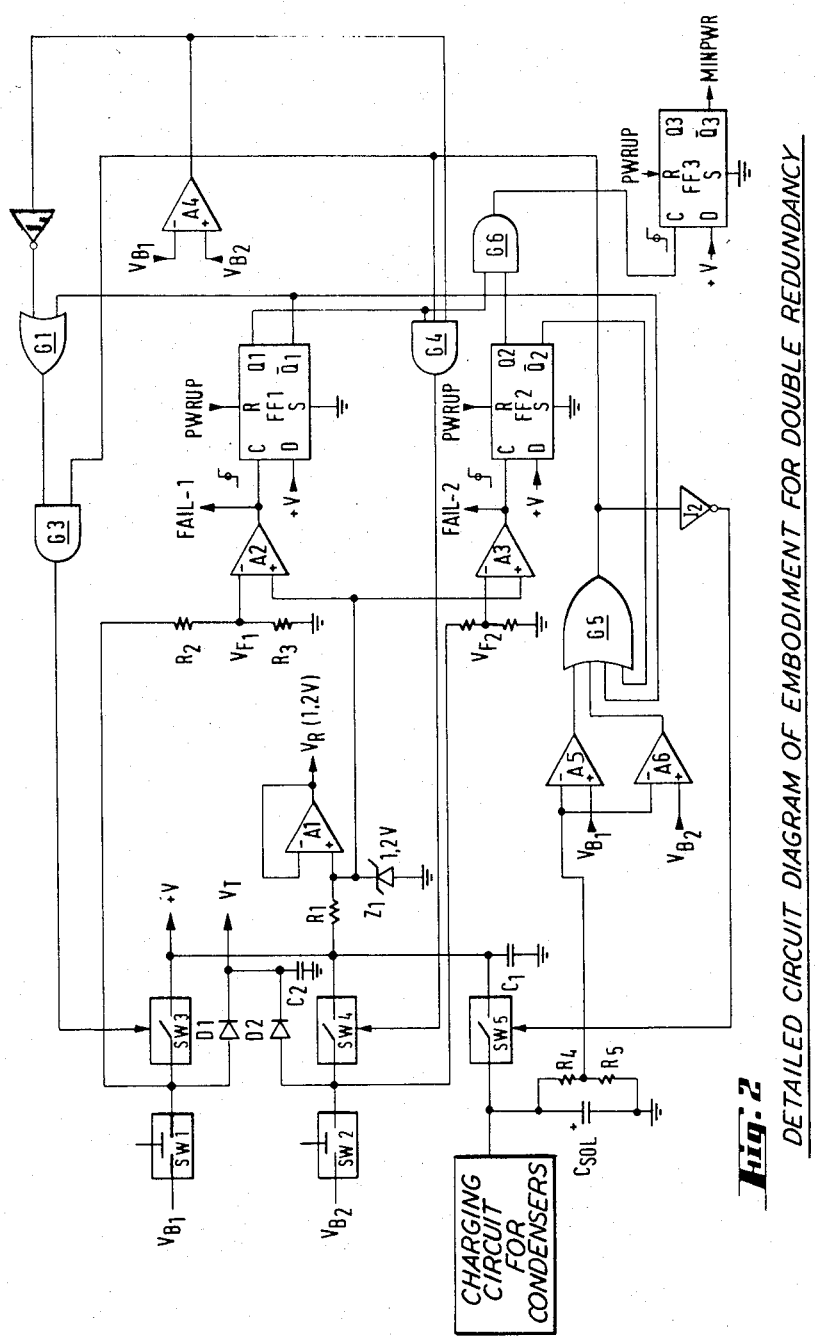
Fig. 2 DETAILED CIRCUIT DIAGRAM OF EMBODIMENT FOR DOUBLE REDUNDANCY

CURRENT SUPPLY CIRCUIT FOR ELECTRONIC SAFETY SKI BINDINGS

The invention relates to a current supply circuit for electronic safety ski bindings comprising a battery feeding a releasing circuit and feeding the electronic circuit which receives by way of converters signals corresponding to the respective forces acting on the leg of the skier and which delivers a releasing signal to the releasing circuit on the occurrence of forces endangering the skier's leg.

The safety of electronic safety ski bindings depends decisively on the current supply. If only one battery is provided to energize electronic safety ski bindings, the binding is useless if this battery fails, so that a considerable safety risk can occur if the current suddenly fails.

It is therefore the problem of the invention to provide a current supply circuit for electronic safety ski bindings that ensures adequate safety even when a battery feeding the binding fails or its capacity drops below a level maintaining the safety functions.

According to the invention, this problem is solved in that at least two batteries are provided which are so connected to the electronic circuit and releasing circuit by way of an electronic control circuit that only one feeds same, and that the control circuit switches the current supply to the other battery when the capacity of the first battery has dropped below a limiting value which, with an adequate safety factor, is above the level maintaining the functioning of the electronic circuit and releasing circuit. The current supply device of the invention ensures that, after one battery fails, the other is available as a reserve battery which maintains all safety functions of the electronic binding. The current supply circuit according to the invention thereby not only provides increased safety against current failure but also maintains the operability of the binding over a longer period because each of the two batteries undertakes the energization of the electronic binding as long as its capacity is adequate.

In a further embodiment of the invention, the respective battery separate from the electronic circuit and releasing circuit feeds additional safety circuits having a lower current consumption. These additional safety circuits can be circuits automatically setting the threshold value or circuits making additional measured values available. They may also be circuits increasing the comfort as well as the manipulation of the binding. The particular construction of these safety circuits is not the subject of the present invention.

If these safety circuits are fed by a lithium battery which is held ready, a low dissipation of current from this battery is desired because its operative condition is ensured only when taking a low current from it over a prolonged period. With other types of batteries the dissipation of current for the additional safety circuits would likewise not lead to marked weakening of the battery.

When the capacity of the battery has dropped to below the limiting value, its capacity is still sufficient for feeding the safety circuits and thus relieve the battery which maintains the safety functions.

In a further embodiment of the invention, acoustic and/or optical warning means are provided to indicate a drop in the capacity of a battery below the limiting value. The skier will then know that he should replace this battery for a new one at the next opportunity. However, the discharge or failure of a battery alone will not yet render the binding useless.

According to an inventive development, an electronic control circuit is provided which connects the condenser storing the charge for the releasing pulse to the electronic circuit as a source of current supply when the current supply to the electronic circuit by the battery is interrupted. Such interruptions can occur for short periods for example in the case of vibrations. The low discharge of the releasing condenser during such short time intervals is acceptable because it is still charged sufficiently to deliver an adequate surge of current to the electromagnet controlling the releasing mechanism if a releasing pulse occurs.

In a further embodiment of the invention, additional safety is obtained in that an electric control circuit is provided which, when the capacity of the second battery drops below the limiting value, interrupts all the circuits not directly serving the safety release.

A feature will now be described with which the operating reliability of an electronic safety ski binding is increased in that other sources of current are employed when the main or reserve current supply fails because the battery is exhausted or there are faults in the circuit. Three redundant current sources are provided, namely two independent sets of batteries and condensers of large storage capacity which normally supply the energy necessary for actuating the electromagnetic releasing means.

The operation of the system is based on the function of logic circuits which ensure that the main current source is switched off and the reserve source switched on if the voltage of the main source drops below a predetermined value. On switching over, an acoustic or optical warning signal is produced so that the skier knows that the current source in the ski binding must be recharged or replaced. As long as this has not been done, the warning signal will be repeated every time the ON-OFF switches are actuated when stepping into the binding. The reserve source of current has the same lifespan as the main source. If the skier ignores the indication of the exhausted main source several times and continues to use the binding until the voltage of the reserve source also drops below the threshold value, a second (different) acoustic or optical warning signal will be produced and the safety circuit ensures that only the most important consumers remain switched on, e.g. force receivers, the voltage frequency converters and the releasing means. If the safety circuit disconnects a battery from the current supply rail of the system, this battery normally still has a life of 20 to 30 hours. Now, in order that the system does not become inoperable when the main current source and the reserve source have been discharged down to the threshold voltage, the safety circuit selects the strongest of the three current sources consisting of the main battery, the reserve battery and the aforementioned storage condensers. This ensures that the three current sources are used uniformly until the voltage to which the condensers are charged no longer suffices to actuate the electromagnetic releasing device, so that the binding can no longer operate. The question as to how the system is to behave just before reaching this condition is still open. Should a last warning signal be given? Should the binding open even though it might just be in use? Or may the skier continue to use the releasing button and he can free himself of the binding only by taking off the ski boot or operating a mechanical auxiliary releasing device? Experience will show which solution is to be preferred.

The consecutive use of the current sources in the manner described above increases the reliability of the ski binding because the safety circuit will be continuously supplied with current even if the mechanical switches open momentarily as a result of strong impacts or oscillations. Since the electronic switches for starting the storage condensers are not influenced by such an impact, an uninterrupted current supply is ensured during the entire normal operation of the ski binding.

The operation of the system will be described with reference to the drawings, in which:

FIG. 1 is a block diagram with the most important functional components, and

FIG. 2 is a circuit of one embodiment.

According to FIG. 1, mechanical switches 1 and 2 are, as hereinbefore described, operated when the ski boot is inserted in the binding. Only the higher voltage is applied to the safety circuit. This is normally the voltage of the reserve current source because the main source initially feeds the entire processing system and therefore has a lower voltage. The low current consumption of the reserve current source is intentional and advantageous because it is intended to use lithium batteries in the ski binding, which are prevented, by a constant withdrawal of a weak current, from becoming dormant, which often leads to difficulties with lithium batteries. The comparator circuits detect when the voltage of one of the current sources drops below the predetermined value at which change-over is to take place and emit the signals for causing another current source to be connected to the current supply rail of the system. The comparator circuits also produce two warning signals, namely one for the main current source and one for the reserve source. After switching off the reserve current source, the system is switched to economy operation, i.e. only the most important consumers remain connected.

FIG. 2 is a detailed circuit diagram of an embodiment with doubly redundant current supply. The description will first be of normal operation where both batteries are sufficiently charged and no faults have occurred in the circuit. Operation commences when the mechanical switches SW 1 and SW 2 are closed by stepping into the ski binding. This applies the main current source $V_{B1}$ to the diode D1 and the reserve current source $V_{B2}$ to the diode D2. The higher voltage is transmitted by the respective diode so that a blocking voltage is applied to the other diode and the voltage $V_T$ is obtained which is required to operate the electronic devices of the safety circuit. The resetting signal PWRUP (system switched on) applied to $FF_1$, $FF_2$ and $FF_3$ ensures that the large signal is applied to all outputs $\overline{Q}$ on commencement of operation, so that the signal $\overline{Q}_1$ transmitted through the OR gate G1 causes the electronic switch SW3 to close and the system voltage to be applied to $+V$. Since the small signal is at the output Q1 of $FF_1$, the small signal is also present at the output of the AND gate G4 and the switch SW4 is open. The reserve source of current $V_{B2}$ is therefore separated from the current supply rail $+V$. The amplifier A1, resistor R1 and Zener diode Z1 form a circuit for delivering a stabilised voltage $V_R$ amounting to 1.2 V in this example. The resistor R1 is so small that the current flowing through the Zener diode Z1 suffices to maintain the reference voltage of 1.2 V until the voltage of the current source connected to the current supply rail $+V$ drops to below the predetermined threshold value.

The amplifier A1 is a voltage follower which defines a voltage source of low impedance transmitting a stabilised voltage to the parts of the system requiring same. The amplifier A2 is a comparator of which the minus input is connected to the tapping of the voltage divider consisting of the resistors R2 and R3. The voltage divider voltage $V_{F1}$ drops to 1.2 V when the output voltage of the main current source $V_{B1}$ has dropped to such an extent that the reserve current source is connected to the system. In this case, the large signal appears at the output of A2, so that a warning signal FAIL-1 is produced. At the same time, the voltage rise effects keying of $FF_1$ so that the large signal appears at the output Q1 and the small signal at the output $\overline{Q}_1$. FF2 has the same function with respect to the battery $V_{B2}$. In the normal course of events, the small signal is now at output Q2 and the large signal at output $\overline{Q}_2$ because the battery $V_{B2}$ should now be substantially fully charged. For the same reason, the comparator A4 having $V_{B1}$ and $V_{B2}$ connected to its inputs transmits the large signal to the NOT element $I_1$. With a small signal at $\overline{Q}_1$ and at the output of $I_1$, small signals will be both inputs of the OR gate G1, so that a small signal will also be present at its output. Consequently, there will also be a small signal at the output of gate G3 even though the OR gate G5 now applies a large signal to the other input of G3, of which the one input has a large signal applied to it by the output $\overline{Q}_2$.

When the small signal appears at the output of G3, the switch SW3 opens so that the battery $V_{B1}$ is disconnected from the current supply rail $+V$. Since the large signal is at output Q1, it is also at the output of A4 and the output of G5. On the appearance of the large signal at the output of the AND gate G4, the switch SW4 now closes so that the battery $V_{B2}$ is applied to the current supply rail. The preceding description relates to when $V_{B1}$ is switched off after its normal exhaustion and $V_{B1}$ is switched on. Without a third source of current, the AND gate G3 would be unnecessary and the amplifier A4 would repeatedly change its condition and apply to the current supply rail $+V$ always that battery $V_{B1}$ or $V_{B2}$ which has the higher voltage. There will now follow a description of how the third current source is connected to the system.

When $V_{B2}$ is so exhausted that the large signal appears at the output of the comparator A3, the warning signal FAIL-2 is produced and the voltage rise causes the keying over of FF2. As a result, the large signal appears at the output Q2 and the small signal at output $\overline{Q}_2$. By reason of the large signals at the outputs Q1 and Q2, the large signal appears at the output of the AND gate G6 and FF3 is therefore keyed over. The system is thereby switched to NINPWR (economy operation) and the small signal appears at the output $\overline{Q}_3$ so that the switches for all those functions of the system which are not absolutely essential for releasing the binding open. The small signal is now at the outputs $\overline{Q}_1$ and $\overline{Q}_2$ so that the small signal is present at two of the four inputs of the OR gate G5. As previously mentioned, the third current source is formed by the storage condensers serving to feed the electromagnets of the electromagnetic releasing means. These condensers are designated $C_{SOL}$. The resistors R4 and R5 define a very high ohmic voltage divider to keep the current therethrough low. The voltage divider is connected to a respective one input of the amplifiers A5 and A6 which each form one comparator.

The voltage divider is intended to ensure that the system voltage and condenser voltage are compatible if the normal condenser voltage is higher than the normal voltage of the system; otherwise, the voltage divider can be omitted. The lowest voltage at which the electromagnet will still respond is present at the tapping of R4, R5. If this voltage is higher than the voltage of $V_{B1}$, the small signal is at the output of A5 and, if it is higher than the voltage of battery $V_{B2}$, the small signal is at the output of A6. If the small signal is present at the outputs of A5 and A6, the small signal is at all inputs of the OR gate G5 and the AND gates G3 and G4 are closed and therefore the switches SW3 and SW4 are open. By reason of the negation performed in the NOT element I₂, the switch SW5 is now closed, so that the storage condensers are connected to the current supply rail. As soon as the voltage of the condensers drops below the voltage of one of the batteries $V_{B1}$ and $V_{B2}$, the battery with the higher voltage takes over the supply of current to the system again in the previously described manner.

If the mechanical switches open momentarily as a result of strong impacts or oscillations, the condensers C1 and C2 connected to the current supply rail $+V$ or to the feed line $V_T$ for the safety circuit supply the circuits with current for a period which is sufficient for carrying out all the switching steps. The time necessary for this is no more than a few microseconds.

We claim:

1. A power supply system for release circuitry of an electronic ski binding, said system comprising:
    a first electrical source including a first battery electrically connectable to said release circuitry;
    a second electrical source including a second battery electrically connectable to said release circuitry;
    switching means including first switching means connected to said first and second electrical sources, said first switching means being actuable for alternately connecting one of said sources to said release circuitry and the remaining non-connected electrical source(s) being isolated from the connected electrical source, and second switching means for actuating said first switching means in response to selection signals; and
    comparison means electrically connected to said electrical sources and to said second switching means for continuously monitoring the electrical potentials of said electrical sources and for generating selection signals indicative of the one of said electrical sources having the highest electrical potential, the potentials of said electrical sources defining a floating reference valve as a basis for the generation of said selection signals; said second switching means actuating said first switching means to connect the one of said electrical sources having the highest electrical potential to said release circuitry in response to the generation of said selection signals.

2. The invention according to claim 1 wherein said system further includes a third electrical source electrically connectable to said circuitry.

3. The invention according to claim 2 wherein said system further includes means for reducing the load on said third power source in response to the connection of said third electrical source to said release circuitry.

4. The invention according to claim 2 and further including alarm means for emitting a first alarm signal in response to the connection of said second electrical source to said circuitry, and for emitting a second alarm signal in response to the connection of said third electrical source to said circuitry.

5. The invention according to claim 2 wherein said third electrical source comprises a capacitor.

6. The invention according to claim 5 wherein said first switching means comprise mechanical switches for connecting said batteries to said circuitry and an electrical switch for connecting said capacitor to said circuitry and wherein said comparison means includes means for actuating said electrical switch to connect said capacitor to said circuitry in response to the opening of said mechanical switches.

7. The invention according to claim 1 and further including alarm means for emitting a first alarm signal in response to the connection of said second electrical source to said circuitry.

8. The invention according to claim 1 and further including:
    means for initially energizing said power supply system;
    means for comparing the electrical potential on said first electrical source to a first value;
    means responsive to the initial energization of said power supply system for maintaining the connection of said first electrical source to said circuitry when the electrical potential of said first electrical source falls below the electrical potential of the other electrical source(s) until the electrical potential of said first electrical source falls to said first value.

9. A power supply system for release circuitry of an electronic ski binding said system comprising:
    a first electrical source including a first battery electrically connectable to said release circuitry;
    a second electrical source including a capacitor electrically connectable to said release circuitry;
    switching means including first switching means connected to said first and second electrical sources, said first switching means being actuable for alternately connecting one of said sources to said release circuitry and the remaining non-connected electrical source(s) being isolated from the connected electrical source, and second switching means for actuating said first switching means in response to selection signals; and
    comparison means electrically connected to said electrical sources and to said second switching means for continuously monitoring the electrical potentials of said electrical sources and for generating selection signals indicative of the one of said electrical sources having the highest electrical potential, the potentials of said electrical sources defining a floating reference valve as a basis for the generation of said selection signals;
    said second switching means actuating said first switching means to connect the one of said electrical sources having the highest electrical potential to said release circuitry in response to the generation of said selection signals.

10. The invention according to claim 9 wherein said system further includes means for reducing the load on the electrical source connected to said circuitry in response to the connection of said second electrical source to said release circuitry.

11. The invention according to claim 9 further including alarm means for emitting a first alarm signal in response to the connection of said second electrical source to said circuitry.

12. The invention according to claim 9 and further including a third electrical source electrically connectable to said circuitry, and alarm means for emitting a first alarm signal in response to the connection of said second electrical source to said circuitry, and for emitting a second alarm signal in response to the connection of said third electrical source to said circuitry.

13. The invention according to claim 9 wherein said first switching means comprise mechanical switches for connecting said electrical sources to said circuitry and an electrical switch for connecting said capacitor to said circuitry, wherein said comparison means includes means for actuating said electrical switch to connect said capacitor to said circuitry in response to the opening of said mechanical switches.

14. The invention according to claim 9 and further including:
  means for initially energizing said power supply system;
  means for comparing the electrical potential on said first electrical source to a first value;
  means responsive to the initial energization of said power supply system for maintaining the connection of said first electrical source to said circuitry when the electrical potential of said first electrical source falls below the electrical potential of the other electrical source(s) until the electrical potential of said first electrical source falls to said first value.

* * * * *